J. & T. D. RICHARDSON.
Cocks for Controlling Discharges through Two Pipes.
No. 142,120.　　　　　　　　　　　　Patented August 26, 1873.
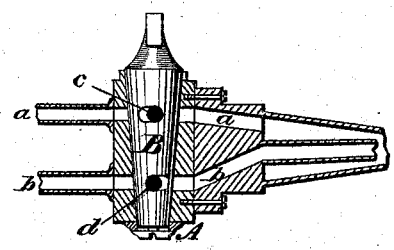
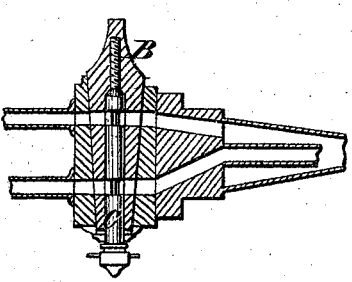
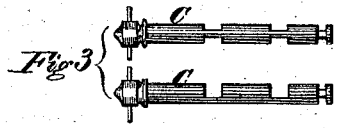
 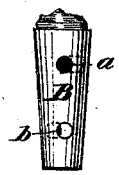 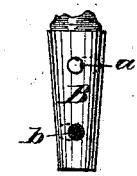
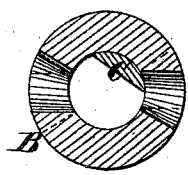
Witnesses.
Harry King.
Harry Coleman.
Inventor.
John Richardson
and
Thos. D. Richardson
By Dodge & Son
Attys

UNITED STATES PATENT OFFICE.

JOHN RICHARDSON AND THOMAS D. RICHARDSON, OF NEW YORK, N. Y.

IMPROVEMENT IN COCKS FOR CONTROLLING DISCHARGE THROUGH TWO PIPES.

Specification forming part of Letters Patent No. 142,120, dated August 26, 1873; application filed November 16, 1872.

*To all whom it may concern:*

Be it known that we, JOHN and THOMAS D. RICHARDSON, of New York, in the county of New York and State of New York, have invented certain Improvements in Cocks for Controlling the Discharge through Two Pipes, of which the following is a specification:

Our invention relates to a cock for controlling the flow or discharge through two independent pipes at the same time; and the invention consists in a peculiar manner of constructing the cock, whereby it is enabled to control both the total and the relative discharge through the two pipes, and to cut off entirely the flow through either or both.

Figure 1 is a central section through our cock in its simplest form; Fig. 2, a central section through the cock in its complete form, with a central spindle in the plug; Fig. 3, a view showing different forms of the spindles; Fig. 4, a cross-section of the plug with one of the spindles therein; and Figs. 5, 6, and 7, views showing the different adjustments of the cock.

Our cock is designed more especially for use in connection with oxyhydrogen-gas burners, for the purpose of controlling the flow of the gases, and the relative proportions of their mixture; but it may, of course, be used wherever applicable, and for controlling either gases or fluids.

In constructing our cock we first provide a barrel, A, and mount therein a conical plug, B, in the ordinary manner. The barrel we provide with two passages, *a* and *b*, which lead inward to one side of the plug, and continue outward, in the same line, on the opposite side thereof, as shown in Figs. 1 and 2. The two passages are parallel, but entirely independent of each other, to carry the different gases, which are introduced through pipes suitably connected, as shown. Centrally through the plug B we make two throats or openings, *c* and *d*, in line with the respective passages *a b*, so that when the plug is so adjusted as to bring either throat opposite or in line with its passage, the gas will be allowed to flow through the same, as in an ordinary cock.

The mouths of the throats *c d* are made wider than the passages *a b*; and, instead of being arranged in the same traverse line, they are set slightly out of line with each other—that is to say, in such position that, although a straight line drawn on the outside of the plug parallel with its axis will cross both throats, the center of one will be on the right of the line, while the center of the other will be on the left of the same, as shown in Fig. 2. The result accomplished by this arrangement is clearly shown in Figs. 5, 6, and 7.

When the plug is set in the position represented in Fig. 5, both of the throats *c* and *d* coincide with their passages, and the gases are permitted to flow freely through both passages. Upon turning the plug toward the left, however, as shown in Fig. 6, the lower throat *d* closes, and checks or diminishes the flow through the passage *b*, while the upper throat remains wide open, and permits a free flow of the gas through the passage *a*. Upon turning the plug toward the right, as shown in Fig. 7, instead of toward the left, the upper throat *b* closes, so as to limit the flow through passage *a*, while the lower one, *d*, remains wide open, and allows a free flow through passage *b*.

Thus it will be seen that, by turning the plug to the right or left, the flow through the one or the other of the passages may be diminished to any desired extent, while the other is allowed to flow with a full head, and that in this way the two gases may be caused to mingle at the burner in any required proportions.

By turning the cock far enough to the right or left, either gas may be shut off entirely; and by turning it still farther, they may both be shut off.

It will be observed that, while the cock as above constructed is capable of regulating the comparative or relative flow of the two gases, it cannot, at the same time, control the total amount of gas passing through both. In order to accomplish this we mount centrally within the plug a stem or spindle, C, as shown in Fig. 2. The spindle is provided, on its inner end, with a screw-thread, and on its outer end with a milled head, by which it may be turned, and thereby caused to move endwise.

At the points where the stem or spindle passes the throats *c d* it is reduced in diameter, as shown, so that, when properly adjusted, it does not interfere with the flow of the gases. By turning the spindle, it is caused to move endwise, so that its body closes the throats, and diminishes the flow of both gases.

The plug B, it will be seen, serves to control the relative flow of the two gases, in order to vary the component parts of the flame; while the spindle serves to control the quantity of both gases to govern the size of the flame.

The spindle, instead of being arranged to move endwise, may be flattened or perforated, and simply arranged to turn, in order to close the throats.

Some of the different forms in which the spindles may be made are shown in Fig. 3.

It is obvious that, instead of arranging the passages $a$ $b$ in line with each other, and the throats of the plug out of line, the arrangement may be reversed—that is to say, the throats arranged in line with each other, and the passages in the plug set out of line. While the same result would be accomplished by this last arrangement, it is, for various reasons, objectionable and inferior to the other.

It is also obvious that, instead of employing the plug to regulate the relative flow of the two gases, and the spindle to control the total quantity, the reverse arrangement may be adopted, and the spindle used to regulate the relative flow, while the quantity is governed by the plug.

The cock constructed on our plan is exceedingly cheap and simple, and answers all the purposes of two separate cocks of the ordinary construction, as it serves to control the flow of each gas independently of the other. It may, of course, be used wherever applicable, but is more especially adapted for use in connection with the double-concentric pipe, for which we have filed an application bearing even date herewith, as shown in Fig. 4, one passage being connected with the central pipe, and the other with the annular space between the two. When this is done, and the supply-pipes concealed, as usual, the gas-fixtures present the same appearance as those of the ordinary construction.

Having thus described our invention, what we claim is—

1. The herein-described cock, having its barrel provided with the passages $a$ and $b$, and its plug provided with the throats $c$ and $d$, when arranged substantially as shown and described, whereby the relative discharge through the two openings may be varied, as set forth.

2. In combination with a cock constructed substantially as herein described, the central spindle C, for regulating the size of both throats.

JOHN RICHARDSON.
THOS. D. RICHARDSON.

Witnesses:
ALEX. MASON.
JNO. VINCENT.